United States Patent
Tesanovic et al.

(10) Patent No.: US 11,113,701 B2
(45) Date of Patent: Sep. 7, 2021

(54) CONSUMER PROFILING USING NETWORK CONNECTIVITY

(71) Applicant: FUJITSU LIMITED, Kawasaki (JP)

(72) Inventors: Milos Tesanovic, Middlesex (GB); David Snelling, Bucks (GB); Aisha Naseer Butt, Middlesex (GB); Balakrishnan Bhaskaran, Exeter (GB)

(73) Assignee: FUJITSU LIMITED, Kawasaki (JP)

( * ) Notice: Subject to any disclaimer, the term of this patent is extended or adjusted under 35 U.S.C. 154(b) by 771 days.

(21) Appl. No.: 14/661,460

(22) Filed: Mar. 18, 2015

(65) Prior Publication Data

US 2015/0310460 A1   Oct. 29, 2015

(30) Foreign Application Priority Data

Apr. 23, 2014   (EP) .................................. 14165621

(51) Int. Cl.
  *G06Q 30/00*   (2012.01)
  *G06Q 30/02*   (2012.01)
  *H04W 4/029*   (2018.01)

(52) U.S. Cl.
  CPC ..... *G06Q 30/0201* (2013.01); *G06Q 30/0202* (2013.01); *H04W 4/029* (2018.02)

(58) Field of Classification Search
  CPC .......... G06Q 30/0255; G06Q 30/0235; G06Q 10/105; G06Q 10/103; G06Q 10/067;
  (Continued)

(56) References Cited

U.S. PATENT DOCUMENTS

2002/0032627 A1   3/2002   Perot et al.
2002/0062251 A1   5/2002   Anandan et al.
(Continued)

FOREIGN PATENT DOCUMENTS

JP   2004-320217        11/2004
JP   2005-100175 A1   4/2005
(Continued)

OTHER PUBLICATIONS

Lee et al., FleaNet: A Virtual Market Place on Vehicular Networks., IEEE Transactions on Vehicular Technology, 2009 (Year: 2009).*
(Continued)

*Primary Examiner* — Patricia H Munson
*Assistant Examiner* — Uche Byrd
(74) *Attorney, Agent, or Firm* — Staas & Halsey LLP

(57) ABSTRACT

A method and associated apparatus (30) which, based on profiles of shoppers (100), along with the time spent by shoppers at each of a plurality of retail establishments, suggest offers most suitable to that particular profile. Shoppers' trails (past and present) are considered in order to generate and update profiles and predict future behavior and offer tailored incentives. For locating shoppers, an active Wi-Fi receiver on a mobile phone or other personal communication device can be identified by an access point (20, 22, 24) in a shop (10, 12, 14) by its MAC address as the shopper moves through a shopping centre, even if the device never connects to the access point. It is not necessary to identify the shoppers as named individuals; rather, it is possible to anonymously recognize them based on the MAC address.

14 Claims, 7 Drawing Sheets

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 2002/0091568 | A1 | 7/2002 | Kraft et al. |
| 2008/0031194 | A1* | 2/2008 | Yaqub ................ H04W 12/04 370/331 |
| 2008/0270579 | A1* | 10/2008 | Herz ................ G06F 17/30867 709/219 |
| 2011/0029362 | A1* | 2/2011 | Roeding ................ G01S 5/0257 705/14.13 |
| 2012/0323663 | A1 | 12/2012 | Leach |
| 2013/0103764 | A1* | 4/2013 | Verkasalo ......... G06F 17/30241 709/204 |
| 2013/0198007 | A1* | 8/2013 | Selinger ................ G06Q 30/02 705/14.66 |
| 2013/0322400 | A1* | 12/2013 | Visuri ................ H04W 36/36 370/331 |
| 2014/0108149 | A1* | 4/2014 | Jabara ................ G07F 17/3218 705/14.64 |
| 2016/0244311 | A1* | 8/2016 | Burks ................ B67D 1/0858 |

FOREIGN PATENT DOCUMENTS

| | | |
|---|---|---|
| JP | 2006-126926 A1 | 5/2006 |
| JP | 2009-210887 A1 | 9/2009 |
| JP | 2013-31080 | 2/2013 |
| WO | 2005-111880 A1 | 11/2005 |
| WO | WO 2009-137154 A1 | 11/2009 |
| WO | WO 2013/134865 A1 | 9/2013 |

OTHER PUBLICATIONS

European Search Report dated Jul. 3, 2014 in corresponding European application 14165621.5.
Notice of Reasons for Refusal for Japanese Application No. 2015-069202 dated Dec. 12, 2018.
Decision for Refusal for Japanese Application No. 2015-069202 dated Mar. 13, 2019.

* cited by examiner

| MAC Address ID 49 | MAC Address 41 |
|---|---|
| MAC 001 | 01-23-45-C7-89-AD |
| MAC 002 | 00-B0-D0-86-BB-F7 |
| MAC 003 | 09-89-A2-U9-I0-A1 |
| MAC 004 | 66-M8-2S-GH-I9-A9 |

CONSUMER PROFILING USING NETWORK CONNECTIVITY

CROSS-REFERENCE TO RELATED APPLICATIONS

This application claims the benefit of European Application No. 14165621.5, filed Apr. 23, 2014, the disclosure of which is incorporated herein by reference.

BACKGROUND

1. Field

The present invention relates to consumer profiling, more particularly to profiling of shoppers based on their shopping habits in stores.

2. Description of the Related Art

Consumer profiling systems have received considerable attention in recent years. These can enhance the consumer's experience when shopping in a store by, for example, providing a targeted advertisement or offer based on a consumer's profile. Key challenges for such systems are the trade-off between privacy and efficient profiling, and techniques for tracking user behavior and making relevant and meaningful inferences.

Store loyalty cards are one example of such systems. However, these are generally specific to one retailer or retail group, and so do not give a complete picture of consumer behavior. They also rely on the consumer being willing and able to present the card at the time of making a purchase. Even then, loyalty card systems only provide information about purchasing habits, not about other aspects of the consumer's behavior when in a store such as the route taken, amount of time spent in the store, and so forth.

It has been proposed to use RFID (Radio Frequency IDentification) technology to detect and identify the movement of consumers through stores. This, however, relies on shoppers being willing to wear a RFID tag, and on the widespread provision of RFID transponders within stores.

Another approach is to track consumers' behavior by monitoring items being added to and removed from a specially-equipped shopping receptacle, to create a list of items present in the shopping receptacle.

In summary, the following inefficiencies are identified in the state-of-the-art:

- inability of consumers to easily opt in/out of such profiling;
- restricted set of information on a consumer, limiting the usefulness of the profile;
- lack of technical methods needed to enable offering benefits to consumers;
- lack of co-operation between different retailers, or even stores of a single retail chain;
- the consumer is not identified or recognized until the retail transaction is almost completed.

US2014/108149 A1 discloses a method, a system, and a server according to the preamble of each independent claim. In one embodiment, a customer performs a registration process to identify themselves and provide personal details as part of a profile including purchase history. In another embodiment, even without the customer performing a registration process, movements of the customer through a store are tracked to generate potential marketing information.

SUMMARY

Additional aspects and/or advantages will be set forth in part in the description which follows and, in part, will be apparent from the description, or may be learned by practice of the invention.

According to a first aspect of the present invention, there is provided a method of profiling customers of commercial facilities including one or more retail establishments, each commercial facility having access points for mobile devices of customers, and transaction points for customers to make transactions, the method including:

at the access points, detecting the mobile devices and generating time-stamped location reports; and at the transaction points, generating time-stamped transaction reports of transactions made by customers; characterized by correlating in time the time-stamped location reports of the mobile devices with the time-stamped transaction reports in the commercial facility to create probabilistic links between a specific customer and a specific transaction; and building a probabilistic customer profile in the absence of identity information of the customer, based on the probabilistic links.

Here, the "commercial facilities" can include, in addition to the one or more retail establishments, any kind of business where transactions can be performed. Correlating in time means to match location records with transaction records on the basis of their respective time-stamps: records having similar time-stamps are assumed to be connected, such that the customer involved in a given transaction is probably also the user of a mobile device detected at around the same time.

Preferably, mobile devices are distinguished from one another on the basis of identification information transmitted by the mobile devices. For example, the identification information is a MAC address. However, the identification information need not explicitly identify the customer (mobile device user).

The method may further comprise generating, from the probabilistic customer profile, a personalized offer targeted at the customer.

This can involve deriving a "context" for the customer, and taking the context into account when generating the personalized offer. The context can refer to the kind of activity being performed by the customer, such as shopping trip or lunch break.

Further, the customer may be categorized as one or more of a plurality of customer types or "personas" on the basis of the probabilistic customer profile, the persona being used when generating the personalized offer.

In an embodiment, the method further comprises displaying the offer on a display means located in the vicinity of the location recorded in the most recent time-stamped record of the mobile device. In this way, there is no need to have knowledge of the customer's contact details such as the device IP address.

In a still further embodiment, the method further comprises:

predicting a future location of the customer on the basis of the probabilistic customer profile; and notifying the commercial facility at that location.

Here, an optional further step is to predict a time period during which the customer is likely to remain at the future location on the basis of the probabilistic customer profile.

According to a second aspect of the present invention, there is provided a customer profiling system including mobile devices of customers, access points of at least one commercial facility, transaction points of at least one commercial facility, and a server; where:

the access points are arranged to detect the mobile devices and to provide time-stamped location reports to the server; and the transaction points are arranged to provide time-stamped transaction reports of transactions made by customers; characterized in that the server is arranged to correlate in time the location reports of the mobile devices with the transaction reports to create probabilistic links between a specific customer and a specific transaction, and generate a probabilistic customer profile in the absence of identity information of the customer, based on the probabilistic links.

According to a third aspect of the present invention, there is provided a server for use in a customer profiling system including, in addition to the server, mobile devices of customers, access points of at least one commercial facility, and transaction points of at least one commercial facility; where:

the server is arranged to receive time-stamped location reports of the mobile devices, from the access points; and the server is arranged to receive time-stamped transaction reports of transactions made by customers, from the transaction points; characterized in that the server is arranged to correlate in time the location reports of the mobile devices with the transaction reports to create probabilistic links between a specific customer and a specific transaction, and generate a probabilistic customer profile in the absence of identity information of the customer, based on the probabilistic links.

In the above aspects, as in the first aspect, the at least one commercial facility includes one or more retail establishments.

According to a fourth aspect of the present invention, there is provided software which, when executed by a processor in a computer, provides the server as defined above.

Embodiments of the present invention employ the consumer's device MAC (Media Access Control) address in order to collect a variety of information and synthesize it to establish knowledge and its application that is not currently available through any other system to the retailers. Consequently, embodiments of the present invention can address the trade-off between privacy and efficient profiling, and of making meaningful inferences from tracking user behavior, by enabling profile development in the absence of consumer identity by using device data only.

Embodiments can identify, track and predict the customer's shopping behavior in a wider shopping environment while enabling targeted advertisement and impromptu offers that drive impulse purchases or alternatively simply provide knowledge to intelligently serve a customer in a manner that improves customer experience of the retailer/shop.

Thus, embodiments of the present invention collect a variety of information and synthesize it to establish knowledge that is not currently available to retailers through any other system. Tailored incentives are enabled for each individual customer (without the need for the customer in question to disclose additional personal information), which are then either advertised in selected stores using digital signage or sent to the customer using electronic communication.

The proposed invention is based on the subject of Big Data and Data Analytics in particular. It provides a powerful alternative to store-loyalty cards. The reason it is powerful is that it can recognize approaching customer in terms of that customer's preferences and frequency/spread of transactions, all predominantly anonymously. This enables store staff to make impromptu targeted offers to meet customer needs, speed up shopping, and drive the impulse purchases.

Throughout this specification, the terms "customer", "shopper" and "consumer" are synonymous. The "customer" is also the "user" or "owner" of a mobile device. Likewise the terms "store", "shop", "retail establishment" and "retailer" are synonymous.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
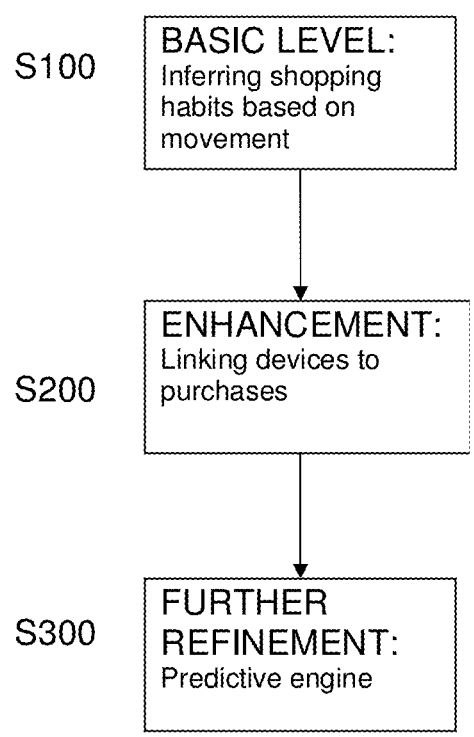
FIG. 1 is a flowchart of the main steps variously employed in embodiments of the present invention.

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will now be explained with reference to the drawings.

An aim of the embodiments is to devise technical enablers for inferring shopping habits based on the movement of shoppers, linking shoppers' wireless devices to purchases, and enabling an enhanced consumer profiling system which offers incentives to both the consumer and the retailer. To this end, a system is disclosed which enables profile development in the absence of consumer identity by only using device data and shops' retail transactions records (including both cash and non-cash transactions). Collecting this information, the shop(s) can put together a picture of the phone owner's shopping habits as individual shopper, if not as a named person. The customer is thus "anonymously recognized" whilst respecting his/her privacy.

Collecting this information together with time stamps and then time-correlating with a shop's sales transaction records can provide at least a probabilistic profile of the person(s) associated with the device. That is, if a specific mobile device is detected in the vicinity of a given transaction point (such as cash register) in a store, at a certain time, then it is likely that a transaction performed at that transaction point at around the same time was made by the owner of that mobile device.

Over a period of time (covering repeated visits by the customer) the probabilistic profile can be built up and gradually become more reliable. The assumption here is that shops are small/medium size with small range of goods and services and that the user visits the shop frequently—for example, coffee-shops, clothing boutiques, fast food retailers etc. These are all examples of the "commercial facilities" referred to in the claims. In the case of larger shops, other means of tracking customers through their premises can assist in refining the time correlation analysis sufficiently to enable construction of a probabilistic profile of user. In addition, by collating the above data with data collected about the same device from other sources (assuming that there is no restriction on sharing this information) an even more comprehensive profile of an individual shopper can be constructed.

A method and associated apparatus are then described which based on received profiles of shoppers, along with the time spent at each store, generates advice, suggestions and/or offers most suitable to that particular profile. This mechanism considers shoppers trails (past and present) in order to establish/revise/refine profiles and predict future behavior and offer tailored information and incentives.

Some assumptions in at least some embodiments of the present invention are that:

(i) a sufficient proportion of customers of interest carry a mobile device of some description (such as a smartphone or tablet) with them wherever they go.

(ii) the mobile device has a Wi-Fi function (or alternative short-range wireless capability—see later) which is activated whilst the customer is shopping.

(iii) the mobile device has a distinctive device identifier such as a MAC address, which is used for communication and to advertise the presence of the mobile device to wireless networks.

(iv) the mobile device is sufficiently personal to one customer (that is, not shared among unrelated persons) that its movements are representative of the activities of that customer or at least of related customers.

(v) shops are equipped with wireless area networks (such as Wi-Fi networks) accessible to the customers' mobile devices.

(vi) retailers in the same geographical area are willing to provide data from their respective wireless area networks to a Cloud Server, in the expectation of receiving back useful information on customer habits.

For the purposes of understanding the present invention, it is unimportant how the commercial aspects of the system are organized. However, it is expected that typically the Cloud Server will be managed by an independent third party, separate from the stores, and with which the store owners have an agreement for access to the information generated on fair and equal terms. Embodiments of the present invention may find particular application in the context of a shopping mall where a large number of stores and other retail outlets are located in the same vicinity, and/or to stores or outlets with common ownership.

Embodiments to be described rely on the fact that a consumer's mobile device, such as a Wi-Fi-equipped smartphone or other personal communication device, can be identified by an access point in a shop by its MAC address as the consumer moves through a shopping centre, even if the device never connects to the access point. While in its most basic form the invention is oblivious to the customer identity and links purchases with the MAC address of the device rather than a named customer, some of the embodiments enable associating the MAC address with a named customer; by doing so, the type of items bought is associated with the MAC address, enabling purchases made to be used for more accurate profile updates.

Even if the MAC address is not explicitly associated with a named customer, identifying the customer's device implicitly detects the presence of the customer of the device in the store. Thus, the presence of the customer as a known individual can be recognized without having to know the identity of the customer. This is referred to henceforth as "anonymously recognizing" the customer.

Thus, in a first embodiment, time-stamped customer location records (e.g. obtained using Wi-Fi MAC address recognition) are correlated in time with stores' retail transaction records (which are also time-stamped) to create a probabilistic link between a customer and specific retail purchase/transaction. Over a period of time (preferably an extended period of weeks or months, covering several shopping trips of the same customer) the links can be aggregated over time to establish a probabilistic customer profile.

Here, multiple visits to the same or associated establishments are correlated with purchase history to associate purchases with a MAC address, even in the absence of customer identity (i.e. without needing access to credit card or other identity information from the "upper layers"). In this way, purchase history can be anonymously associated with a MAC address and the individual user targeted without disclosing privacy information.

In a second embodiment, the above principle of using MAC addresses to identify/recognize customers is extended to subsequently anonymously recognizing the customer and their preferences or repeat purchases prior to initiating a retail transaction, thus enabling shop staff to make impromptu targeted offers or recommendations to stimulate impulse purchases.

The incentives offered to the owner of the device are uniquely linked to the device MAC address; if the incentive is acted on, the device profile is updated accordingly. One specific example would be providing the device owner with a voucher linked to the device MAC address. This embodiment can be extended to paired-up/linked MAC addresses: the system identifies devices which browse in pairs/groups; this could then be used for gift suggestions for the owner of one of the devices sent to their "pair", or for inferring that the group in question is a family and providing vouchers for family activities etc.

A third embodiment goes further by enabling statistical path projection, or in other words, predicting where the consumer, once detected in a store or the like, is likely to go next. This prediction can go down to the level of shopping aisles within a store if the access points (APs) are densely distributed or if say in addition to Wi-Fi connectivity, Near-Field Communication (NFC) is used. Such path projection can also predict the likely time available for shopping based on the consumer's past behavior. This permits helpful advice to be given to the consumer, such as advising on the quickest route to get the best offers, or the most needed items.

A fourth embodiment combines any of the earlier embodiments with an explicit linkage of the consumer to the mobile device. In other words, instead of the consumer being anonymously recognized as in the previous embodiments, the consumer gives permission for their personal information to be known to the system so that (in contrast to the earlier embodiments) the consumer's identity is known. This allows the prediction engine to have access, potentially, to demographic information of the consumer, information about their preferences or hobbies, the consumer's shopping list, their partner's or friend's wish list, their Smart Refrigerator connected to the Internet, and so on. By the consumer agreeing to disclose contact details such as their e-mail address, telephone number or an IP address of the mobile device, a personalized offer can be transmitted directly to the device.

This embodiment can be extended by establishing an explicit association between the actual action of purchase and the device MAC address. In reality actual purchases would be linked to e.g. the user's credit card, bank account, or loyalty program. In this case, an offer can be transmitted to the device, and the owner of the device may decide to take up the offer. In this embodiment, since purchases are done "at upper layers", in order to use purchase information to update the device owner profile (which has so far been based on the MAC address and its whereabouts) an explicit link between the two is provided to create a more reliable (and less ambiguous) profile of that customer.

A fifth embodiment enables the consumer to select a MAC address in order to influence the anonymous recognition and profile-gathering processes. MAC spoofing, or identity masking, is well-known and allows changing of a device identity; therefore, in the present context, consumers can disguise their identity using known techniques (or simply switch off Wi-Fi altogether) if they do not wish to be tracked.

More usefully in terms of generating a statistical profile, the user (via dedicated software running on the smartphone or like device) can select a virtual address from a set of predefined addresses to indicate e.g. that they do not wish to receive offers, or that they do not wish this particular shopping trip to be incorporated in their shopping history (akin to "private browsing").

The above embodiments are enabled by the following key features:

(a) A mechanism that considers physical geography to incorporate shopping history across one or more brands.

(b) A mechanism that enables profile creation in the absence of identity information (e.g. time correlation between presence of specific UE having a given MAC address and that shop's retail transaction records).

(c) A mechanism that tracks path through physical space to identify the place where the consumer will most likely head next.

These key features are summarized in FIG. 1. Thus, there is a key step S100 of inferring a customer's shopping habits based on their movement within a store and between stores, as detailed in FIG. 3 and explained later; an optional further key step of linking customer devices to their purchases in order to generate a profile, as detailed in FIG. 4; and a further optional key Step S300 of predicting a customer's future behavior as detailed in FIG. 5.

Figure 2:
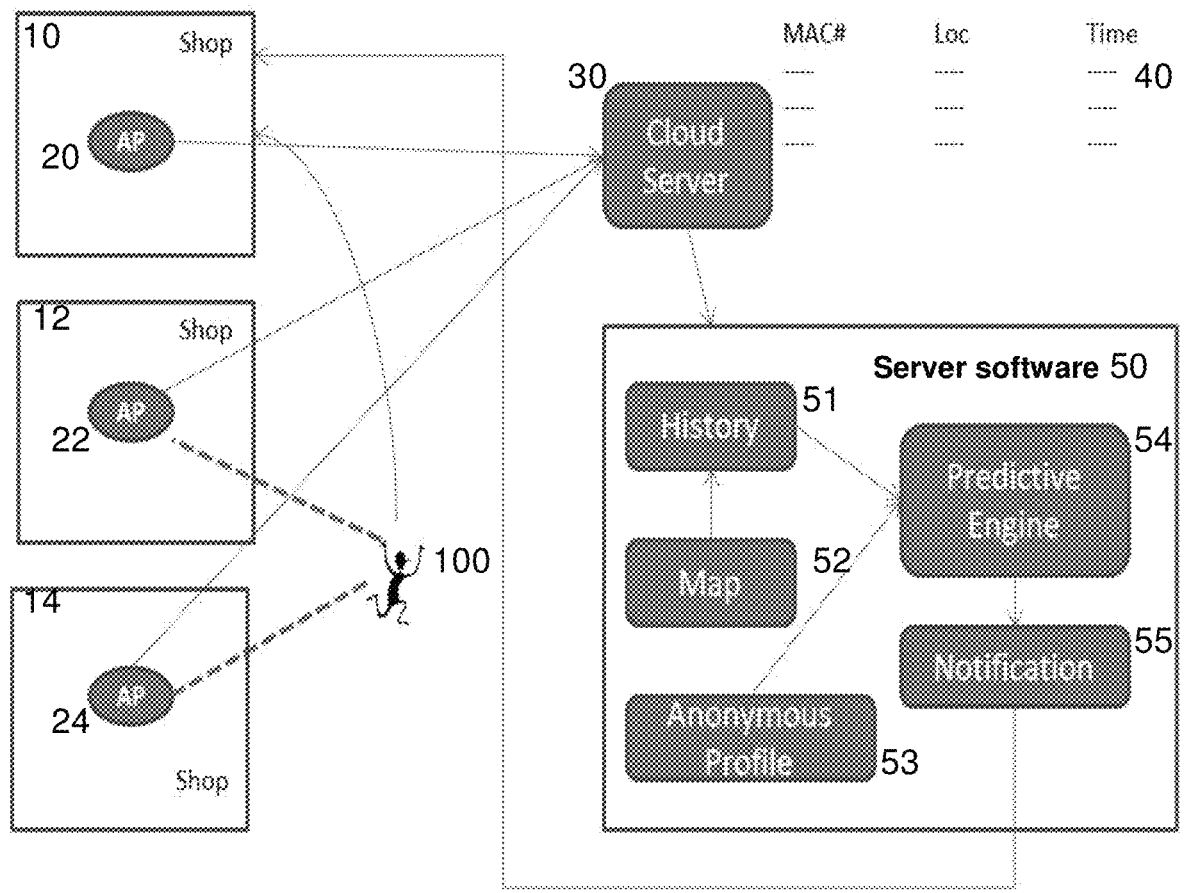
FIG. 2 shows the basic system architecture employed in embodiments of the present invention.

FIG. 2 shows the system architecture in embodiments of the present invention. Some more detailed operations of the system components will be explained with reference to FIGS. 3 to 5.

Shops 10, 12 and 14 are each equipped with Access Points 20, 22, and 24 for wireless communication (for example, Wi-Fi). For simplicity, one AP is shown in each shop but in practice, especially for larger stores, several APs may be strategically positioned around the shop, allowing mobile devices to be tracked as they move around. A user 100 of a mobile device is on a shopping trip and moves around and between the shops 10, 12 and 14. The APs are linked (for example by broadband Internet) to a server 30 which can be located anywhere in the Internet (and thus, "in the Cloud"), and henceforth referred to as the Cloud Server.

The APs 20, 22 and 24 negotiate possible connections with users' mobile devices and in the process collect identifying information, namely the MAC address (MAC# in FIG. 2). This information along with the AP location (Loc) and timestamp (Time) are passed to the Cloud Server 30, which stores the information as a list 40 of time-stamped location reports. The Cloud Server 30 runs software 50 having various functional modules. The set of location reports 40 (as well as other external sources) is queried periodically by the four context generating functions namely the History 51, Map 52, Anonymous Profile generator 53, and Predictive Engine 54, the result being to generate one or more notifications transmitted from Notification function 55.

Figure 3:
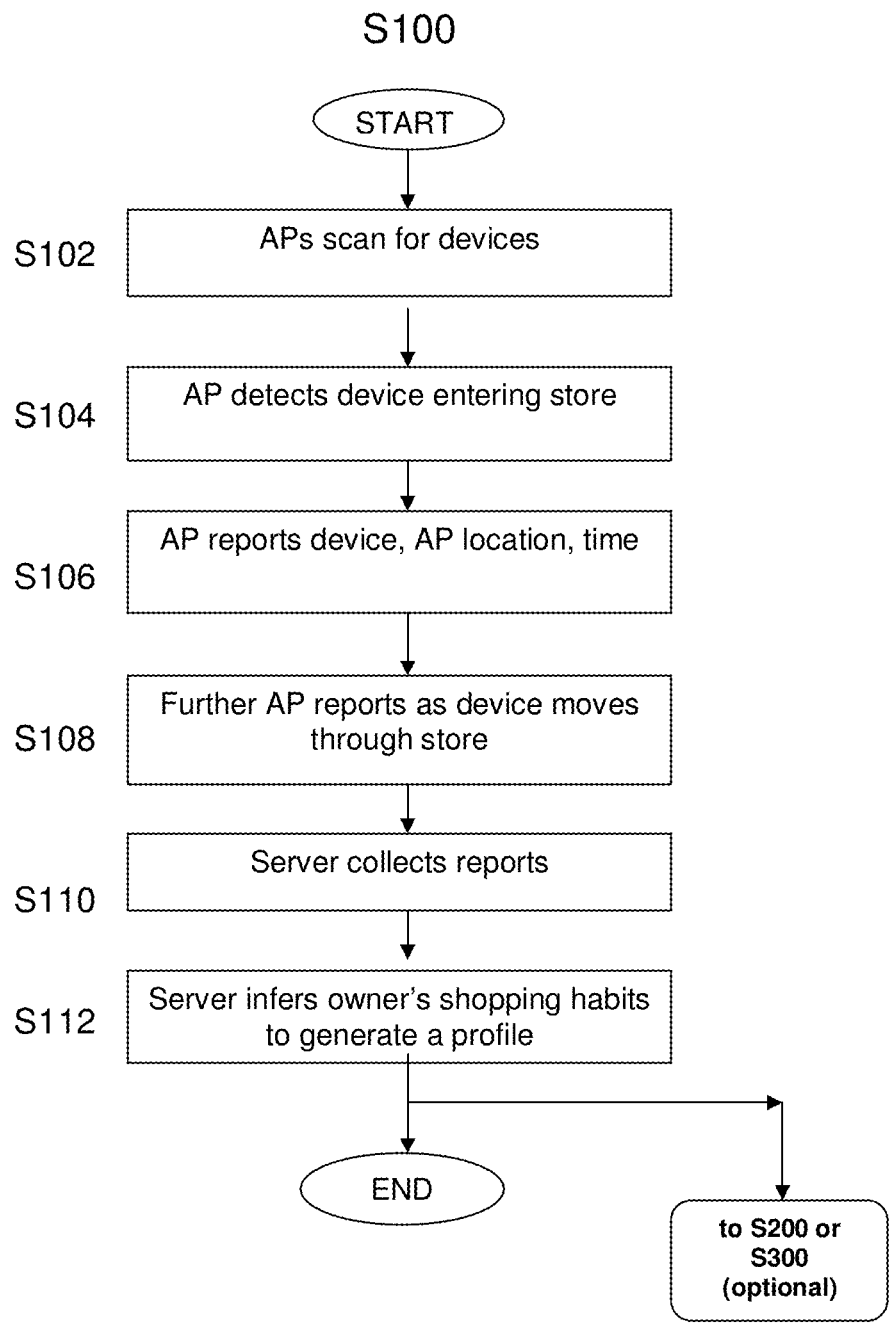
FIG. 3 is a flowchart detailing a step S100 in FIG. 2.

The above process is detailed in FIG. 3, showing the above mentioned key feature S100 of FIG. 1.

In a first step S102, the APs of a shop scan for devices within range. In S104, when a consumer carrying a mobile device enters the shop, an AP detects it. In S106, the AP sends a report of the Device ID (such as MAC address), the AP's own location, and the current time, to the Cloud Server 30. The AP continues periodically to send a report on each device it can currently detect. Such a report is referred to below as a "location report".

In S108, as the consumer moves through the store (or between the store and other stores linked to the same Cloud Server), further AP reports are generated. Typically, there will be other consumers present also, for which reports are likewise generated. In S110, the Cloud Server collects the reports to form a set of reports 40. These collected reports can be used to enable key feature S200, as explained below. At a minimum, collected reports sharing the same device ID are used to build up a profile of the consumer in S112.

The consumer profile is more useful if linked to purchases of the consumer, as in key feature S200 mentioned above.

Figure 4:
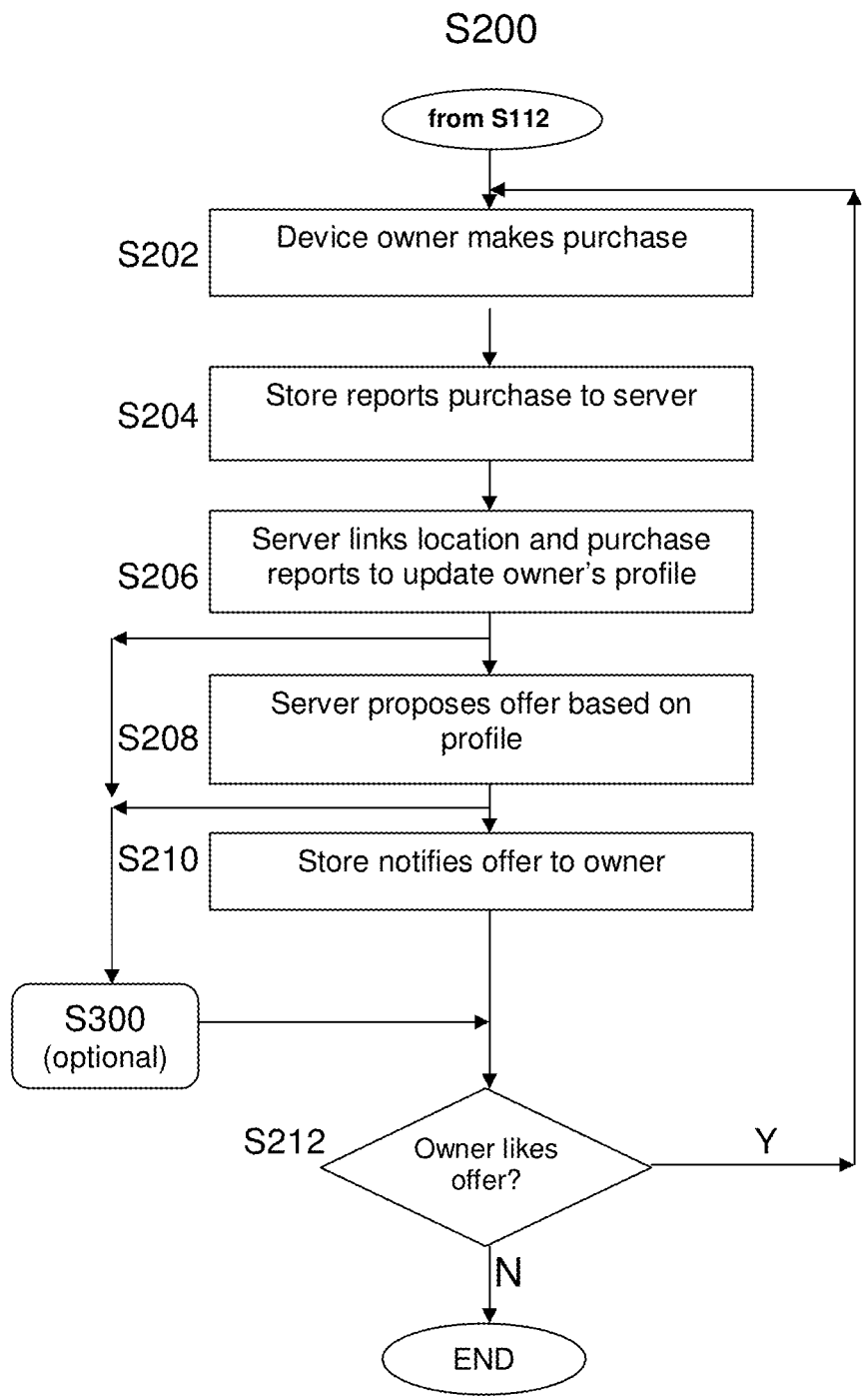
FIG. 4 is a flowchart detailing a step S200 in FIG. 2.
Figure 5:
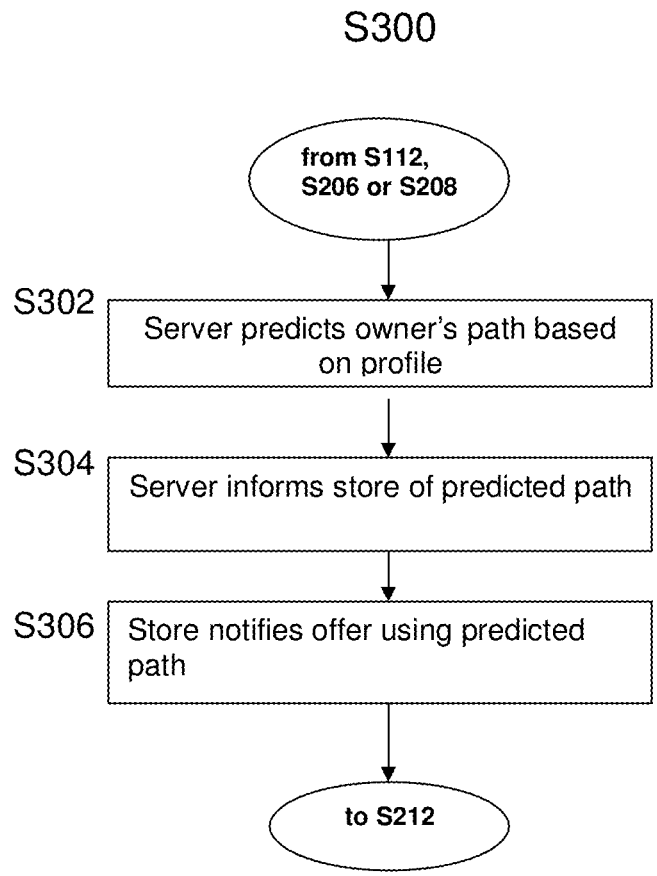
FIG. 5 is a flowchart detailing a step S300 in FIG. 2.

Thus, as shown in FIG. 4, the process from step S110 of FIG. 4 preferably flows to step S202 of FIG. 5, in which the consumer (device owner) makes a purchase and this is reported to the Cloud Server 30 in S204. Such a report will be referred to as a "transaction report". For example, each point-of-sale (POS) terminal of the shop may be arranged to generate a transaction report every time a purchase is made, and a shop accounts system (not shown) may be configured to forward such reports to the Cloud Server.

Then, in step S206 the Cloud Server 30 collates the location reports with the transaction reports. As already mentioned, it is likely that if a specific mobile device is detected in the vicinity of a given POS terminal in a store, at a certain time, then a transaction performed at that terminal at around the same time was made by the owner of that mobile device. Here, the time difference allowed when matching a location report to a transaction report can depend on the type of store and the number of detected devices. In a busy store where the same AP can detect multiple devices at once, a closer similarity of time-stamps would be required in order to determine a match. Whenever reports are matched in this way, the profile associated with the device (and thus, implicitly, with the consumer) is updated accordingly.

In step S208, the Cloud Server 30 proposes an offer based on the profile. For example, the Cloud Server may infer that the device owner has just bought a certain type of product for which some kind of accessory or consumable (battery, printer cartridge, etc) is available. In this case, the "offer" would direct the consumer to the place in the current store (or in another store) where the accessory or consumable can be found.

Alternatively, step S208 may be made by a shop computer. That is, the Cloud Server may supply information of collated reports back to the shop which then decides what action, if any, to take. In any case, it is preferable that any offer from the Cloud Server be made of a recommendation to the shop for review, rather than a direct offer to the device. Thus, in S210 the shop approves the offer (either using software or under manual supervision) and notifies it to the owner. This notification can be done in various ways as already mentioned, including by activating a display in the vicinity of the device's last known location, and (at least in embodiments with an explicit linkage of the consumer to the mobile device) by transmission of a message over Wi-Fi to the mobile device, such as an e-mail or text message.

In addition, or instead of, S210, the third key feature S300 may be invoked at this point, as explained below with respect to FIG. 5.

In S212, the device owner receives the offer and decides whether or not it is of interest. If so (S212, "Y"), the process returns to S202 where the device owner makes the recommended purchase, and this is added to the profile in the same way as before.

If, however, the owner turns down the offer (S121, "N"), the process ends. In an embodiment with an explicit linkage of the consumer to the mobile device, it would be possible to include a step of the owner explicitly declining the offer by replying to a message on the mobile device.

Figure 6:
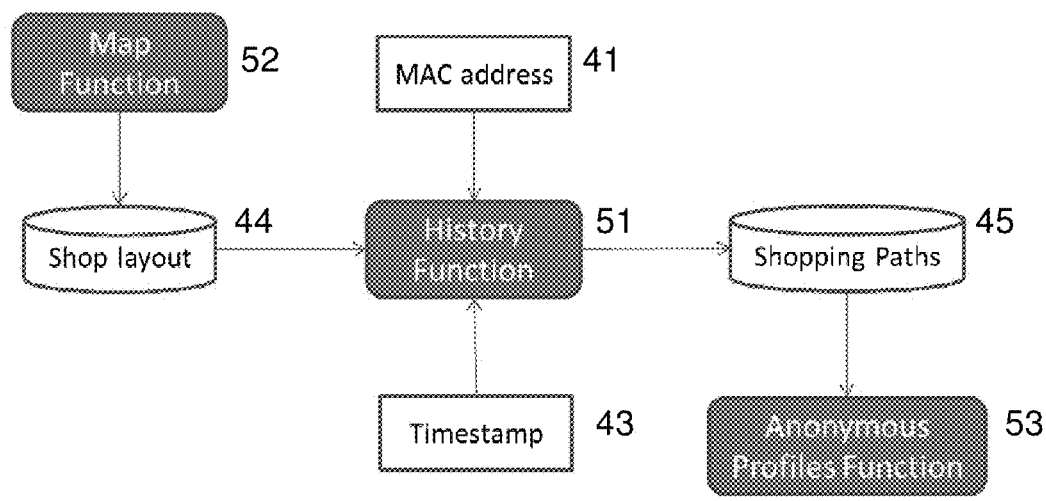
FIG. 6 is a functional block diagram for explaining a history function 51.

Referring now to FIG. 6, this further describes key feature S300 according to which the future path of the mobile device is predicted.

In step S302, the Predictive Engine 54, from the profile generated in S112 of FIG. 3 or updated in S206 of FIG. 4, generates a predictive statement about the user's intent (wandering, browsing, shopping, buying) and likely next destination (which shop). In S304, the Notification function 55 then notifies the destination store about the findings of the Predictive Engine 54.

For example, the Predictive Engine 54 may judge that the customer will next pass by a particular shop, and via the Notification function 55, notify the shop in question that a potential shopper/buyer is on the way. In step S306, the shop may react in any way it chooses, for example by preparing a special offer to send to attract the customer into the shop.

Alternatively, the Predictive Engine 54 may be used to predict behavior within a current store, where the customer's device has already been identified. This can be used, for example, to allow the store to target an advertisement or offer of a product which can be found on the aisle predicted to be visited next by the customer.

In either case, if an offer is made then the flow then returns to S212 of FIG. 4, in which the consumer decides whether or not to take up the offer provided.

The component parts of the system will now be described in more detail.

User 100's Mobile Device: A Wi-Fi or Bluetooth enabled device, with a unique MAC address. The specific wireless technology employed by the device is not important, so long as (as is the case with all current technologies), a MAC address or equivalent is used to identify the device. Typically, a MAC address is 48 or 64 bits long and determined at the time of manufacture, with a first portion specific to the device manufacturer, and a second portion which uniquely identifies the device.

In the fifth embodiment, the MAC address can be altered using a mask with a suitable meaning attached to it (as described above). The device may also be capable of receiving messages intended for its owner, as well as running software which user can use to manually change options, such as opt into the service, set preferences, and so on.

Shop 10, 12, 14: While including shops in an overall shopping area such as a shopping centre or mall, the concept can also include any commercial facility or consumer functions, such as cafes and restaurants, cinemas and theatres, libraries and other public service buildings, mall wide marketing teams, parking and security management, etc.

Access Point 20, 22, 24: System of APs is connected to a Cloud Server and passes on information on MAC addresses in its coverage area, in the form of the location reports referred to earlier. In the fifth embodiment mentioned earlier, the system is trained to recognize the meaning of certain "special" MAC addresses:

"Do not track me on this particular shopping trip" (akin to private web browsing);

"Advise me on best offers on high-priority items" (obtained from shopping list, or through links to consumer 13 details provided above);

"Send me offers via e-mail at a later point rather than using texts/digital signage right now";

"Send me offers on products only priced up to X", with a few options of value X, and so on.

This information exchange can alternatively or additionally be done using higher layer/application level signaling, rather than MAC. That is, the customer may run an application on his smart device allowing him or her to send a command instructing one or more of the options listed above.

Cloud Server 30: The Cloud Server provides an interface for uploading data pertaining to individual MAC addresses detected by access points in the shopping area. The access points providing data are registered with the cloud as being associated with a particular shopping area. The Cloud Server also provides a query interface for the entities in the innovation space (see FIG. 2) to extract data associated with a given shopping area. The Cloud Server is a required component, but need not be under control of any of the stores. Typically it would be provided by a web hosting service.

Further description will now be given of the various functional modules of the Cloud Server 30 by referring to FIGS. 6 to 8.

History Function 51: please refer to FIG. 6. This function calculates the shopping path taken by shoppers based on their MAC addresses and maintains history against or of each MAC address. It considers MAC address 41, shop layout 44, and timestamp 43. It obtains the user's location in the shop (position in a floor plan) from the map function 52. It also calculates the time that the MAC address stays hooked to a particular location (shop, department) in the shop layout 44. That is, by receiving from an AP a sequence of location reports with the same location and device ID, the History Function can calculate the time spent at the AP location as the difference between the first and last records in the sequence.

History is maintained in the absence of identity (only device data is used), which is then saved as shopping paths 45. As an example of a shopping path 45, suppose that Person-X that is holder of a device with MAC address 01-23-45-67-89-AB always follows Route-A while in the shopping mall:—

Shopping Path-A: Enter→Shop A1 [<3 min]→Shop A2 [5 min]→Shop A3 [45 min]→Exit

Here, "A1", "A2" and so forth are merely labels for particular shops (and could be replaced by any suitable form of representation within the Cloud Server). For example, Shop A1 is retail clothing, Shop A2 is a pastry shop, and Shop A3 is a coffee shop. Moreover, each location in Shopping Path-A is time stamped so it is also possible to gather the amount of time (or duration) Person-X spent in each of the shops, as indicated by the numbers in square brackets. These routing patterns are used by the Anonymous Profile Function to generate personas as explained later.

Map Function 52: referring again to FIG. 6, mapping of a MAC address 41 within the given environment is an essential input to the predictive engine 54. In order for the Map Function 52 to work effectively, the access points need to be positioned at strategic locations, to accurately locate a particular MAC address. The map function 52 tracks the MAC address from one Access Point to the other using various techniques such as signal strength triangulation. This information is reconciled with a shop layout 44 to map the location of the MAC address at any given point of time. The shop layout 44 may comprise, depending on the circumstances, the floor plan of a single shop, the plan of a whole shopping complex or mall, or a map of a high street. The location distribution of the MAC address with respect to time will allows the map function to map the movement of the MAC address, to yield the shopping paths 45 mentioned earlier. This information can be passed on to the Anonymous Profile Function 53 as shown in the Figure.

Figure 7:
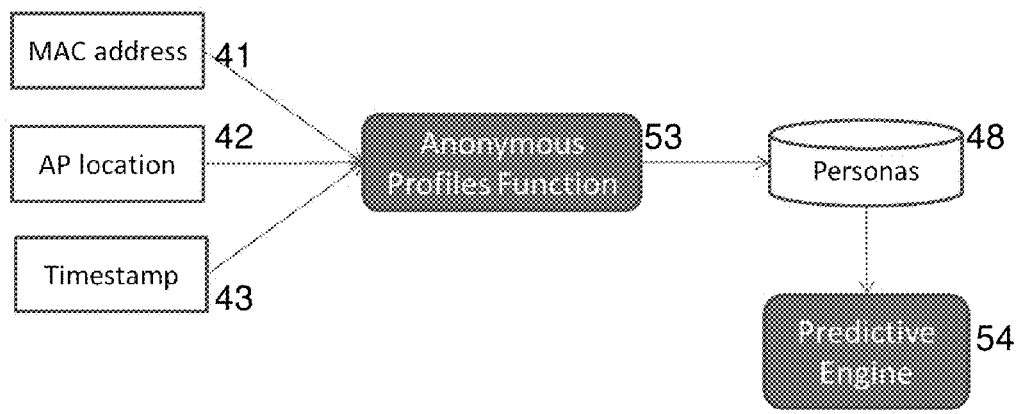
FIG. 7 is a functional block diagram for explaining an anonymous profile function 53.

Anonymous Profile Function 53: referring to FIG. 7, this function generates profiles in the absence of identity (only device data need be used). As shown here, each AP report (location report) consists of the detected MAC address 41, AP location 42, and time stamp 43. Thus, the anonymous profile function 53 takes into account the shopping path, AP location, and timestamp to generate a context for a particular profile. Here, "context" represents the kind of activity being undertaken by the user, for example, the difference between a weekend grocery shop and a weekday lunch break of the same user. Different actions (such as advice or offers) will be appropriate to these different contexts: for example a customer may be more receptive to special offers for new products when they have more time available. Thus, the context is of assistance in generating an offer with respect to an individual customer which is appropriate, not only to the customer's overall profile, but also to his or her activities at a given time.

Further, preferably, the Anonymous Profile Function 53 uses the shopping paths from the history function 51 to categorize consumers into one or more of a set of defined "personas" 48, that are used by the Predictive Engine function 54 as indicated in FIG. 7. Also, the profiling function may incorporate data on shopping patterns from other locales, or even Internet shopping. For Internet shopping data to be used, a cross-layer information exchange is needed as explained in one of the embodiments above.

To explain further, while the "profile" referred to earlier is specific to one specific consumer (device owner), the "persona" represents a class of consumers which may be usefully grouped together for predictive or analytical purposes. Personas may include, for example:
- shopaholic
- coffee lover
- socializer
- leisure shopper
- harassed mother
- and so on. More than one persona may be associated with the same consumer.

Assigning personas in this way can further assist the Cloud Server in producing useful suggestions.

Figure 8:
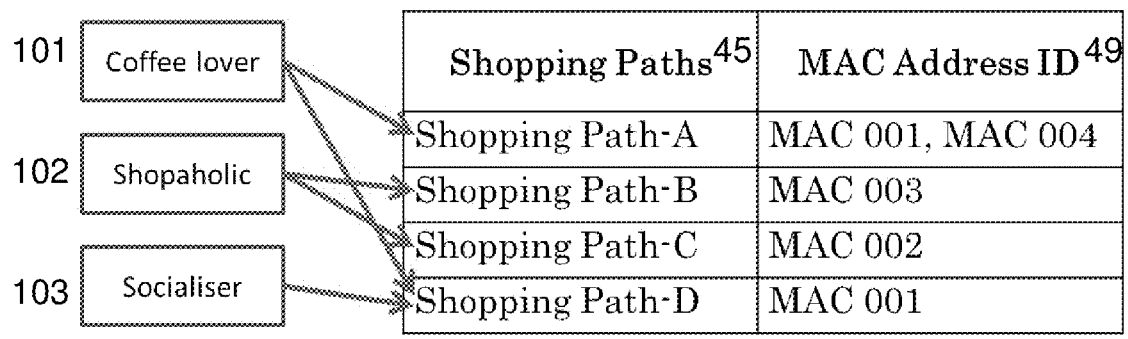
FIG. 8 is a diagram for explaining relationships among MAC Addresses, MAC Address IDs, Personas, and Shopping Paths.

FIG. 8 explains the relationship of MAC Addresses 41 to MAC Address IDs 49, and of MAC Address IDs to Shopping Paths 45.

Simply, the MAC Address ID is shorthand for the actual MAC Address which is typically 48 or 64 bits in length. There is a correspondence table between the two, held in the Cloud Server as shown in the upper part of FIG. 8.

The shopping paths 45, which were generated by the history function 51 as mentioned earlier, are each labeled with a MAC Address ID and then mapped to one or more personas. For example, the Cloud Server may find that a user of a device holding the MAC address ID MAC 004 always follows Shopping Path-A while in the shopping mall, whereas MAC 001 follows Shopping Paths-A and D, both of which match to the profile of a coffee lover 101. So, it can be inferred that the owners corresponding to these MAC addresses are coffee lovers and are not so much interested in shopping. In this way, the Shopping Path can be use both to update and refine the profile, and to predict the user's next move. The personas assist in targeting suitable offers to individual consumers (bearing in mind that it may be impractical to devise a unique offer for every individual). The personas need not be rigid, fixed categories but may be adaptable. Since, for example, Shopping-Path D in FIG. 8 corresponds to more than one persona, the context may be used to distinguish between personas. For example, a customer to whom the two personas "coffee-lover" and "socializer" are assigned may be recognized as being in the context of a mid-morning break, in which case the persona "coffee-lover" would be more appropriate, or as in the context of a more leisurely weekend shopping trip in which case "socializer" might be more appropriate.

The lower part of FIG. 8 shows various shopping paths or routing patterns, and their relationship to personas, such as:

Routing Pattern-A: Enter→Shop A1 [<3 min]→Shop A2 [5 min]→Shop A3 [45 min]→Exit where Shop A1 is retail clothing, Shop A2 is a pastry shop, and Shop A3 is a coffee shop. Moreover, each location in Shopping Path-A is time stamped so it is possible to derive the amount of time (or duration) Person-X spent in each of the shops.

Shopping Path-B: Enter→Shop B1 [10 min]→Shop B2 [45 min]→Shop B3 [60 min]→Shop B4 [30 min]→Exit where Shop B1 is an accessories shop, Shop B2 is a shoe store, Shop B3 is a clothing retailer, and Shop B4 is a home wares store.

Since each location in the shopping paths is time stamped, the duration of a MAC address staying at a particular store can be calculated as a characteristic of the profile. The collective information helps in building a particular profile, and in categorizing that profile as a persona. Data collected about time & location of devices and using MAC addresses to build up historical profile of locations, movements and so on enables the anonymous profile function 53 to categorize the device owner as one of the personas for whom tailored offers can be prepared.

Predictive Engine 54: referring again to FIG. 7, the predictive engine relies on the statistical shopping profile for customers (based on their past purchases linked to MAC address), along with any context and/or personas generated by the anonymous profile function 53, in order to generate probable path projection. Predictions are made concerning the likely time available for shopping, likely items needed, and so on. If predictions are to be updated with actual purchases then cross-layer information exchange is envisaged, as already explained.

Notification Function 55: The notification function implements the business function of the apparatus. It provides a publish/subscribe interface for the use of retailers, market analysts, and other parties interested in real time information about possible shopping habits of people currently in the shopping area. It may also provide a query function allowing non real-time analysis of typical personas identified by the system. Preferably, the notification function is linked to a computer system of the store which is the subject of the notification, allowing review (either with or without human intervention) of suggestions made.

Thus, to summarize, embodiments of the present invention enable the inferring of shopping habits based on the movement of shoppers, linking shoppers' wireless devices to purchases, and enable an enhanced consumer profiling system which offers incentives to both the consumer and the retailer.

To this end, a system is disclosed which enables profile development in the absence of consumer identity by only using device data and shops retail transactions records (including both the cash and non-cash transactions). Collecting this information, the shop(s) can put together a picture of the phone owner's shopping habits as individual shopper, if not as a named person. Collecting this information together with time stamps and then time-correlating with shops sales transaction records can provide at least a probabilistic profile of the person(s) associated with the device. Over a period of time (covering repeated visits by the customer) the probabilistic profile can be built up and gradually become more reliable. The assumption here is that shops are small/medium size with small range of goods and services and that the user visits the shop frequently. For example coffee-shops, clothing boutiques, fast food retailer etc. In case of larger shops, other means of tracking customers through their premises can assist in refining the time correlation analysis sufficiently to enable construction of a probabilistic profile of user. The profile can be augmented by context reflecting the user's current activity and by assigning the customer to one or more personas. In addition, collating the above data with data collected about the same device from other sources (assuming that there is no restriction of sharing this information) an even more comprehensive profile of an individual shopper can be constructed.

A method and associated apparatus can be provided which based on received profiles of shoppers, and along with the time spent at each store, suggests offers most suitable to that particular profile. This mechanism considers shoppers trails (past and present) in order to establish/revise/refine profiles and predict future behavior and offer tailored incentives. A key embodiment, relies on the fact that an active Wi-Fi receiver on a mobile phone or other personal communication device can be identified by an access point in a shop by its MAC address as the consumer moves through a shopping centre, even if the device never connects to the access point.

In one form, the invention anonymizes customers thus minimizing privacy concerns. That is, the invention can be is oblivious to the customer identity by linking purchases with the MAC address of the device rather than a named customer. On the other hand, some of the embodiments enable associating the MAC address with a named customer; by doing so, the type of items bought is associated with the MAC address, enabling purchases made to be used for more accurate profile updates.

Any of the above embodiments may be arbitrarily combined. Various modifications are possible within the scope of the invention.

Reference has been made above to a Wi-Fi-equipped customer device; however, the present invention is not restricted to use with Wi-Fi. Any short-range radio communication technology in which devices identify themselves by use of a MAC address (or equivalent), would be suitable for use with the present invention. Bluetooth (IEEE802.15) is one example. Near-Field Communication (NFC) may also be used.

The kinds of places where the present invention can be applied are not restricted to shops but include any kind of commercial facility or retail establishment, including cafes, bars, restaurants, fast-food outlets, cinemas, theatres, museums and so on. The present invention is ideal for use in small- and medium-sized retail facilities, in which the frequency of transactions from all customers combined is relatively low. This allows a probabilistic link to be made with some confidence between a given transaction and a specific customer as identified by their mobile device. However, the present invention may also be applied to larger stores/establishments given a fine enough location information, since only a limited number of customers will be in the vicinity of a transaction point (cash register, POS terminal) at the same time.

INDUSTRIAL APPLICABILITY

Embodiments of the present invention permit customers to be profiled without the customers having to divulge sensitive personal information, and enables stores to facilitate customers' shopping, by providing information, recommendations and impromptu targeted offers to stimulate impulse purchases.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of profiling users of facilities, each facility having access points for mobile devices of the users geographically distributed within the facility, and transaction points for the users to conduct transactions, the method comprising:
    at the access points, detecting the mobile devices by negotiating possible connections with the mobile devices and collecting information identifying the mobile devices but not the users, and generating time-stamped location reports of the mobile devices in real time;
    at the transaction points, generating time-stamped transaction reports of transactions made by the users in real time;
    at a server linked to the access points and the transaction points, generating correlated reports by correlating in time the time-stamped location reports of the mobile devices with the time-stamped transaction reports and creating a probabilistic link between a specific mobile device of a specific anonymous user and a specific transaction by assuming that, based on the correlated reports, a specific transaction made at a transaction point at substantially a same time as a specific mobile device was detected in a vicinity of the transaction point was made by the specific anonymous user of the specific mobile device;
    at the server, building a probabilistic personalized user profile of the specific anonymous user without access to identity information of the specific anonymous user, based on the probabilistic link;
    updating the probabilistic personalized user profile when the specific anonymous user performs a transaction at a transaction point in one of the facilities; and
    at the server, generating, from the probabilistic personalized user profile, a personalized offer targeted at and provided to the specific anonymous user.

2. The method according to claim 1, wherein mobile devices are distinguished from one another on a basis of identification information transmitted by the mobile devices.

3. The method according to claim 2, wherein the identification information is a MAC (Media Access Control) address.

4. The method according to claim 1, further comprising deriving a context for the customer, and taking the context into account when generating the personalized offer.

5. The method according to claim 1, further comprising categorizing the customer as at least one persona on a basis of the probabilistic customer profile and using the persona when generating the personalized offer.

6. The method according to claim 1, further comprising: displaying the personalized offer on a display located in a vicinity of the location recorded in a most recent time-stamped record of the mobile device.

7. The method according to claim 1, further comprising: linking the probabilistic customer profile to one or both of identity and contact details of the customer.

8. The method according to claim 7, further comprising: transmitting the personalized offer to the mobile device of the customer.

9. The method according to claim 1, further comprising:
predicting a future location of the customer on a basis of the probabilistic customer profile; and
notifying the commercial facility at that location.

10. The method according to claim 9, further comprising predicting a time which the customer is likely to spend at the future location on the basis of the probabilistic customer profile.

11. A profiling system for at least one facility visited by users with mobile devices, comprising:
access points geographically distributed within the at least one facility to detect the mobile devices by negotiating possible connections with the mobile devices and collecting information identifying the mobile devices but not the users, and to provide time-stamped location reports of the mobile devices;
transaction points of the at least one facility, the transaction points arranged to provide time-stamped transaction reports of transactions made by the users in real time; and
a server configured to receive the time-stamped location reports of the mobile devices and the time-stamped transaction reports of transactions made by the users, to generate correlated reports by correlating in time the time-stamped location reports of the mobile devices with the transaction reports, to create a probabilistic link between a specific mobile device of a specific anonymous user and a specific transaction by assuming that, based on the correlated reports, a specific transaction made at a transaction point at substantially a same time as a specific mobile device was detected in a vicinity of the transaction point was made by the specific anonymous user of the specific mobile device, to generate a probabilistic personalized user profile of a specific anonymous user without access to identity information of the specific anonymous user, based on the probabilistic link, to store and update the probabilistic personalized user profile when the specific anonymous user performs a transaction at the at least one facility, and to generate, from the probabilistic personalized user profile, a personalized offer targeted at and provided to the specific anonymous user.

12. One or more non-transitory computer-readable recording media storing program code which, when executed by a processor in a computer, performs a method of profiling users of facilities, each facility having geographically distributed access points for mobile devices of the users, and transaction points for the users to make transactions, the computer linked to the geographically distributed access points and the transaction points, and the method comprising:
at the geographically distributed access points, detecting the mobile devices by negotiating possible connections with the mobile devices and collecting information identifying the mobile devices but not the users, and generating time-stamped location reports of the mobile devices in real time;
at the transaction points, generating time-stamped transaction reports of transactions made by users in real time;
at the computer, generating correlated reports by correlating in time the time-stamped location reports of the mobile devices with the time-stamped transaction reports and creating a probabilistic link between a specific mobile device of a specific anonymous user and a specific transaction by assuming that, based on the correlated reports, a specific transaction made at a transaction point at substantially a same time as a specific mobile device was detected in a vicinity of the transaction point was made by the specific anonymous user of the specific mobile device; and
at the computer, building a probabilistic user profile of a specific anonymous user without access to identity information of the specific anonymous user, based on the probabilistic link;
at the computer, storing and updating the probabilistic personalized user profile when the specific anonymous user performs a transaction at a transaction point in one of the facilities; and
at the computer, generating, from the probabilistic personalized user profile, a personalized offer targeted at and provided to the specific anonymous user.

13. The method according to claim 1, wherein the notification is sent to a display within view of a most recent access point to detect the specific mobile device of the specific anonymous user.

14. The method according to claim 1, wherein the notification is sent to the specific mobile device of the specific anonymous user.

* * * * *